(12) United States Patent
Faauth

(10) Patent No.: US 7,225,655 B2  
(45) Date of Patent: Jun. 5, 2007

(54) METHOD FOR PRODUCING A SHAFT COMPRISING STOP CAPS DEVICE CONTAINING ONE SUCH SHAFT

(75) Inventor: Lothar Fauth, Buehl (DE)

(73) Assignee: Robert Bosch GmbH (DE)

( * ) Notice: Subject to any disclaimer, the term of this patent is extended or adjusted under 35 U.S.C. 154(b) by 135 days.

(21) Appl. No.: 10/513,558

(22) PCT Filed: May 19, 2003

(86) PCT No.: PCT/DE03/01599

§ 371 (c)(1),  
(2), (4) Date: Nov. 3, 2004

(87) PCT Pub. No.: WO2004/018122

PCT Pub. Date: Mar. 4, 2004

(65) Prior Publication Data

US 2005/0166655 A1     Aug. 4, 2005

(30) Foreign Application Priority Data

Aug. 2, 2002   (DE) ................................ 102 35 365

(51) Int. Cl.  
*B21B 1/00* (2006.01)  
*B21D 1/02* (2006.01)

(52) U.S. Cl. ................................. 72/67; 72/84; 72/112

(58) Field of Classification Search .................... 72/67, 72/74, 75, 112, 125, 126, 84; 29/90.01; 74/425; 403/282

See application file for complete search history.

(56) References Cited

U.S. PATENT DOCUMENTS

| | | | | |
|---|---|---|---|---|
| 2,992,572 A | * | 7/1961 | Stamm | 29/243.517 |
| 3,653,243 A | * | 4/1972 | Ramseier | 72/122 |
| 4,226,107 A | * | 10/1980 | Buzzi | 72/121 |
| 4,624,123 A | * | 11/1986 | Marracino | 72/110 |
| 5,127,253 A | | 7/1992 | Takahara et al. | |
| 5,263,238 A | * | 11/1993 | Cooper | 29/444 |
| 5,845,527 A | | 12/1998 | Hoffmann et al. | |
| 6,810,576 B2 | * | 11/2004 | Karl | 29/596 |
| 7,051,611 B2 | * | 5/2006 | Fauth | 74/425 |

FOREIGN PATENT DOCUMENTS

WO   WO 01/65668   9/2001

* cited by examiner

*Primary Examiner*—Ed Tolan  
(74) *Attorney, Agent, or Firm*—Michael Best & Friedrich LLP

(57) ABSTRACT

The invention relates to a method to manufacture a shaft (22) as well as a device containing such a shaft (22), in particular an armature shaft (22) of an electromotive drive (10), which is held by at least one shaft mounting, whereby a curved, rounded stopping tip (40) that can support itself on an axial stopping face (32, 34) is formed at least one fore part (28, 30) of the shaft (22) by means of material displacement.

15 Claims, 3 Drawing Sheets

METHOD FOR PRODUCING A SHAFT COMPRISING STOP CAPS DEVICE CONTAINING ONE SUCH SHAFT

RELATED APPLICATION

This application is a 35 USC 371 of International Application No. PCT/DE03/01599, filed May 19, 2003.

BACKGROUND OF THE INVENTION

The invention relates to a method to manufacture a shaft with rounded stopping tips as well as a device containing such a shaft, as well as a device to manufacture such a shaft in accordance with the species of the independent claims.

With WO 01/65 668, a device has become known that is used, for example, to move window panes, sun roofs or seats. In order to avoid undesired longitudinal play in the armature shaft, it is proposed there that a damping rubber piece be pressed into a recess of the housing on at least one of the fore parts. The armature shaft features a rounded stopping tip on one of its fore parts, which is supported against a stop disk, which is pressed in turn against the damping rubber piece.

This type of rounded stopping tip is normally manufactured by means of turning on a lathe or grinding in a machining process on the fore part of the armature shaft before installation of the electric motor. Afterwards, the rounded stopping tip is polished in order to achieve a high surface quality and then hardened so that the rounded stopping tip does not get damaged when the electric motor is assembled. This method is very labor intensive and expensive.

SUMMARY OF THE INVENTION

The method in accordance with the invention has the advantage that a high-quality and wear-resistant surface is created when forming a rounded stopping tip by means of cold forming in one work step. It is possible to completely dispense with the process steps of polishing and hardening since, on the one hand, the surface is created in one work step by means of material displacements and, on the other hand, this procedural step can be conducted in a favorable manner after assembly of the armature.

Advantageous further developments of the method are possible. In terms of manufacturing techniques, it is especially simple to perform the material deformation by means of a roller-burnishing process in which a rotating rolling tool rolls on the shaft. A very dimensionally accurate, rotationally symmetrical rounded stopping tip can be manufactured as a result. In addition, a long tool service life and a smooth work piece surface are achieved because of the rolling off of the tool.

To manufacture the rounded stopping tip on an assembly line, it is advantageous to secure the shaft with a gripper and adjust a rotating deformation roller with an axial working surface. A radius is then formed on the fore part of the shaft because of the tilting of the axis of the deformation roller, vis-à-vis the shaft axis.

The material deformation takes place during the tilting of the deformation roller on a spiral-shaped line so that with increased tilting of the material of the shaft there is continuous displacement in the radial and axial direction. This continuous flow process creates a very smooth and hard surface of the rounded stopping tip.

Due to the selection of the crossing point of the shaft axis with the axis of the deformation roller when tilting the same, the radius of the rounded stopping tip can be produced in accordance with the requirements of the axial mounting of the shaft. As a result, any desired radii can be formed with one working surface of the deformation roller. Before assembly of the armature shaft on its fore part, a phase is manufactured, through which the diameter of the rounded stopping tip can be prescribed in connection with the pressing force of the deformation roller against the shaft. The phase guarantees that the shaft material can yield during its deformation, thereby reducing deformation volume and deformation time.

It is favorable not to execute the rounded stopping tip until an advanced assembly stage of the electric motor after various components have already been fixed to the armature shaft since then the surface of the rounded stopping tip can no longer be damaged during further assembly.

On the other hand, it is advantageous to form the rounded stopping tip before rolling a worm on the shaft, since then the worm cannot be damaged with acceptance into the deformation head during manufacture of the rounded stopping tip or when fixing the armature shaft.

A device, in accordance with another embodiment of the invention to adjust movable parts in motor vehicles, has the advantage that a cost-effective axial mounting of the armature shaft, which is wear-resistant over long service lives with a surface roughness of the rounded stopping tip of less than one micrometer, is realized with the rounded stopping tips formed by means of a deformation roller.

A device, in accordance with another embodiment of the invention, has the advantage that it can be favorably integrated procedurally into an assembly line due to the axial adjustment and tilting of the deformation roller, vis-à-vis the rotational axis.

BRIEF DESCRIPTION OF THE DRAWINGS

Exemplary embodiments of the devices in accordance with the invention are depicted in the drawing and explained in more detail in the following description. The drawings show.

DETAILED DESCRIPTION

Figure 1:
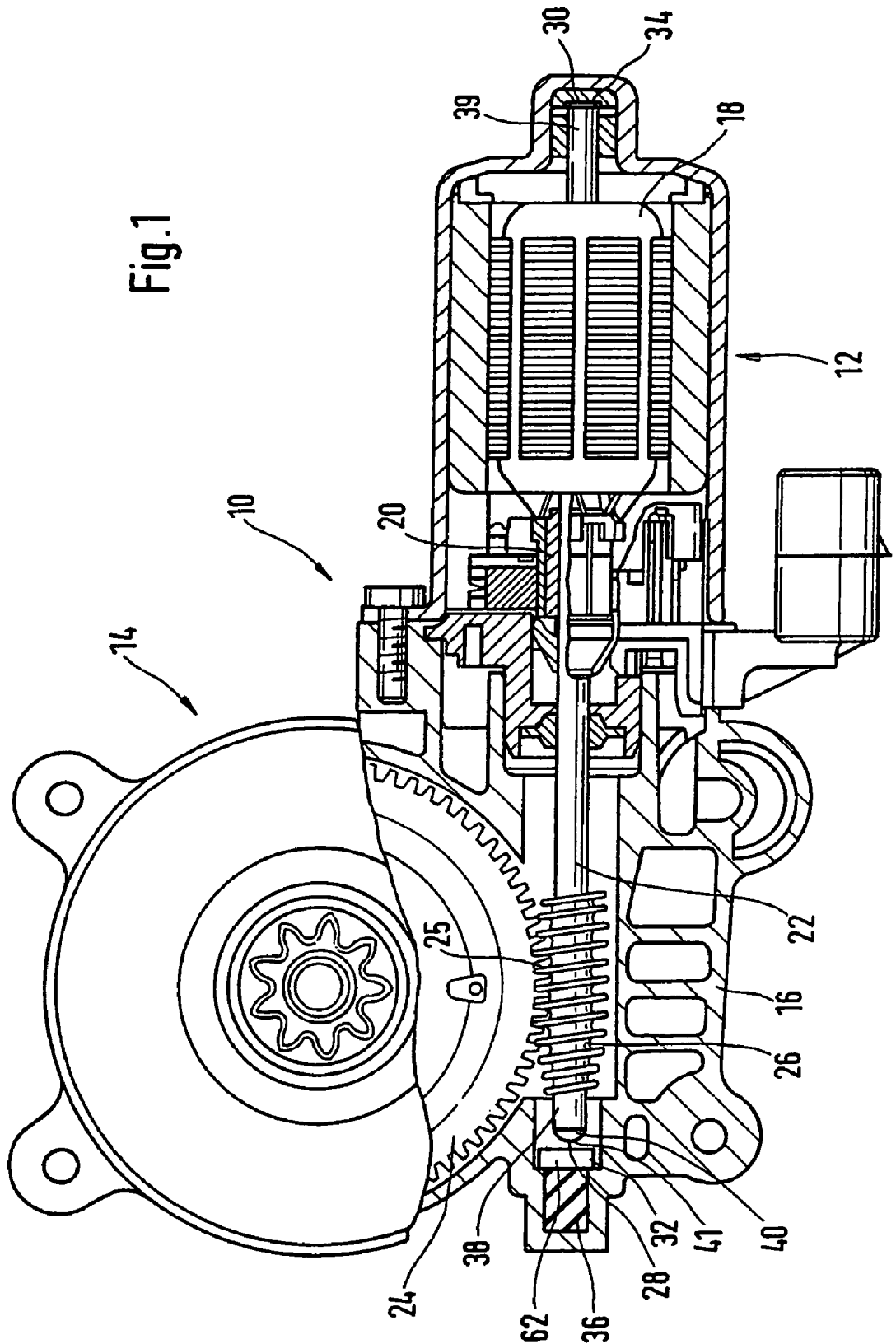
FIG. 1 A section of a device to adjust movable arranged parts.

FIG. 1 shows an adjusting drive 10, with a motor 12 and a multipart housing 16 surrounding a gear 14. The motor 12 is electrically commutated and features an armature 18, a commutator 20 and a multiply positioned armature shaft 22, which extends into the area of the gear 14. A worm 26, which communicates with a worm wheel 24 via gear toothing 25, is arranged on the armature shaft 22. This is supported on the fore parts 28 and 30 of the armature shaft 22 in the longitudinal direction via stop disks 32 and 34, as well as via a damping rubber piece 36 on the housing 16, or a portion of the same. A rounded stopping tip 40 is formed on one end 38 of the armature shaft 22 by means of material displacement. The radius 42 of the rounded stopping tip 40 determines the size of the surface with which the armature shaft 22 is pressed against the stop disk 32. The smaller this surface is, the smaller the frictional losses; however, wear increases with a diminishing stopping face. As a result, the radius 42 of the rounded stopping tip 40 is specified in such a way that a good compromise is achieved between low friction and low wear. In addition, such a great tip height of the rounded stopping tip 40 is selected via the radius 42 that during the entire service life, the rounded stopping tip 40 does not sink too deep into the stop disk 32 (which for the most part is manufactured of plastic), and that the tip edges 41, which delimit the radius 42 of the rounded stopping tip 40, touch the stop disk 32.

Figure 2:
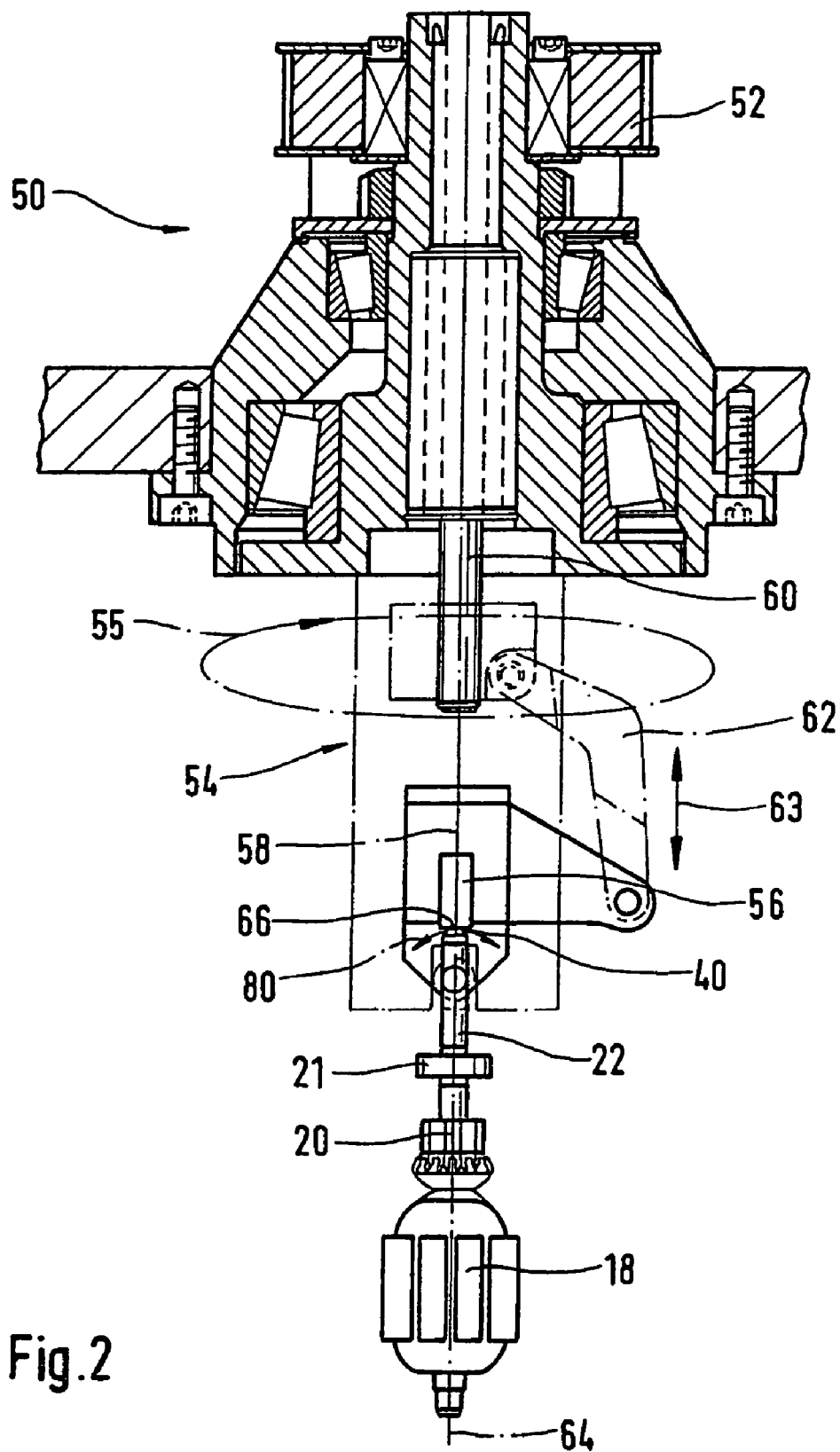
FIG. 2 A device to manufacture a shaft according to the method in accordance with the invention FIG. 3 An enlarged detail of the rounded stopping tip in FIG. 2.

FIG. 2 depicts the method in accordance with the invention on the basis of a device to manufacture a shaft 22. Several components 44, such as an armature 18, a commutator 20 or a ring magnet 21 are already pre-mounted on the shaft 22 before the armature shaft 22 is held for example by means of a gripper (not shown) having, for example, a pivoted guide bush to receive the shaft 22. The deformation device 50 is composed essentially of a drive 52, which allows a deformation head 54 to rotate. A deformation roller 56 is arranged in the deformation head 54 on a central rotational axis 58. The deformation head 54 can be fed in the axially direction 63 by means of an adjusting unit 60 and the deformation roller 56 can be tilted vis-à-vis the central rotational axis 58 of the deformation head 54 via a reversing lever 62. In this exemplary embodiment, the rotational axis 58 lies congruent with an axis 64 of the armature shaft 22. While the deformation head 54 rotates around the rotational axis 58, the deformation roller 56 is set against the fore part 28 of the armature shaft 22 and the deformation roller 56 is tilted vis-à-vis the axis 64 of the armature shaft 22. As a result, the deformation roller 56 touches the armature shaft 22 with an axial working surface 66 in a punctiform deformation area 68, which during the rotation runs in accordance with arrow direction 55 and during tilting of the working surface 66 in accordance with arrow direction 80 on a spiral-shaped line. In this connection, the material of the armature shaft 22 is displaced from the axis 64 radially towards the outside and axially towards the armature 18, whereby a curved surface of a rounded stopping tip 40 is formed on the armature shaft 22. The cold forming of the material produces a compression of the surface material and therefore a surface roughness of less than 1 micrometer.

Figure 3:
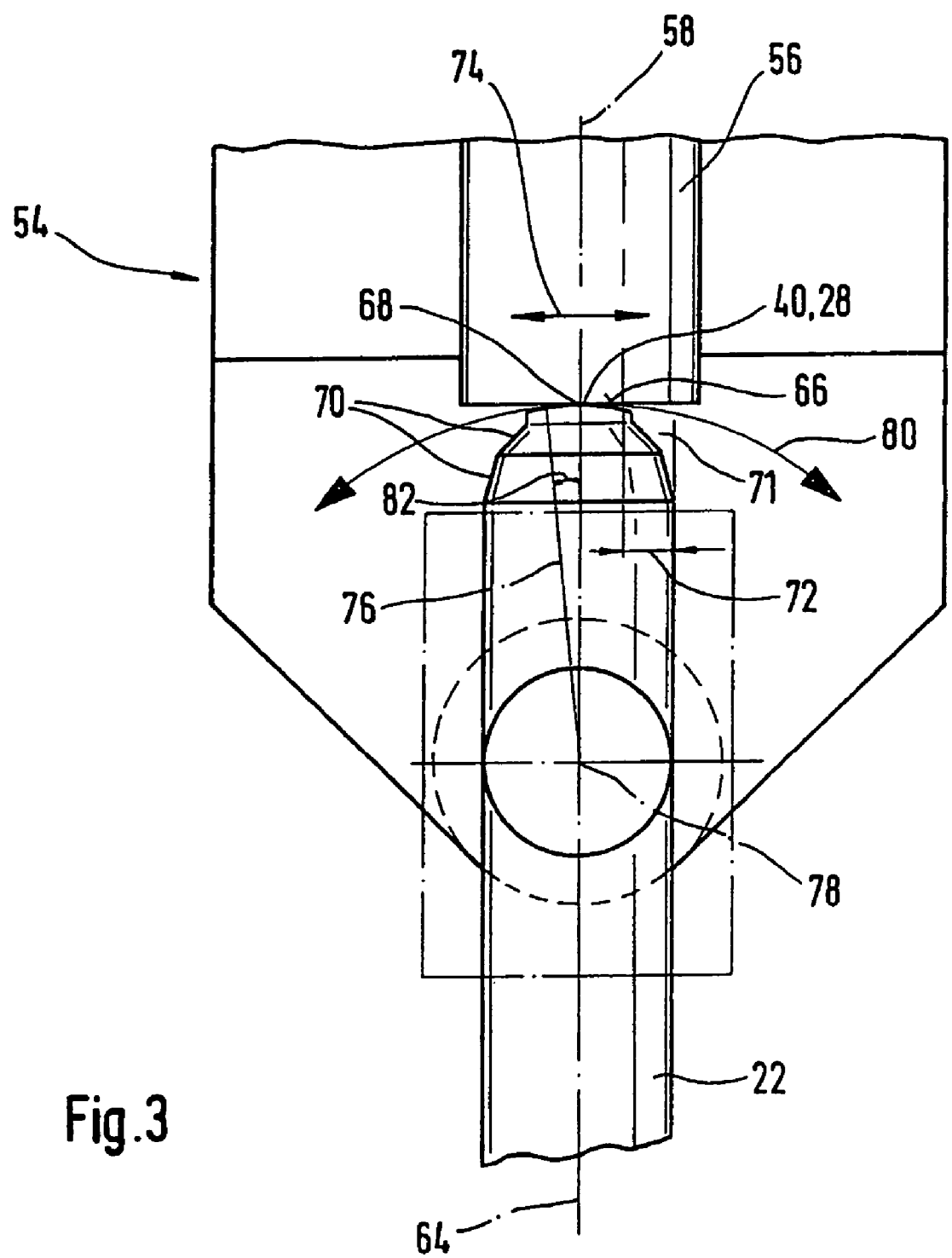

FIG. 3 shows an enlarged detail of the rounded stopping tip 40 in FIG. 2, whereby a phase 70 is manufactured on the armature shaft 22 before forming a rounded stopping tip, which phase permits a corresponding clearance zone 71 for the material deformation by the deformation roller 56. The phase 70 in the exemplary embodiment is executed in two stages, but can just as well be manufactured as a continuous phase 70. The radial extension 72 of the phase 70 specifies, within certain limits and in connection with the to-be-applied application force of the deformation roller 56, a diameter 74 (of 3 to 4 millimeters for example) of the rounded stopping tip 40 since the material cannot be reformed to any width in the clearance zone 71 of the phase 70. The curvature of the surface of the rounded stopping tip 40 has a radius 76, which is created by tilting the axial working surface 66 of the deformation roller 56 around a tilting point 78 on the axis 64 of the armature shaft 22 in accordance with arrow direction 80. In this connection, the deformation roller 56 is tilted in accordance with arrow direction 80, e.g., over an angle range 82 from −5° or +20°. The radius 76 is usually smaller than the swivel radius of the deformation roller 56 since the shaft 22 is subject to axial tension during the deformation process and is permanently pressed back.

In another variation of the method, a rotating deformation roller 56 is attached in a stationary manner and the fore part 28 of the shaft 22 is pressed against the working surface 66 of the deformation roller 56 and tilted vis-à-vis the shaft axis 64 by a tilting angle 82.

In another alternative of the method, the shaft 22 rotates around its axis 64 and is set against the stationary working surface 66 of the deformation roller 56 and either the armature shaft 22 or the deformation roller 56 is tilted by a tilting angle 82.

In the case of these variations of the method in accordance with the invention, what matters is that the fore part 28 of the shaft 22 is rotated against a working surface 66 and these two surfaces are continuously tilted against one another. As a result, a high-quality surface of a rounded stopping tip 40 is generated by means of material displacement, which rounded stopping tip can be formed on one or both ends 38, 39.

In another exemplary embodiment, as the method of material displacement, a curved stamping tool is moved under pressure against the fore part 28, 30 of the shaft 22, whereby this does not necessarily have to be a pure rotational movement.

It is preferred that the method in accordance with the invention be used for manufacturing an electric gear/drive unit, but it is not limited to this. The invention also includes individual features of the exemplary embodiments or any combination of the features of the different exemplary embodiments.

The invention claimed is:

1. Method to manufacture an armature shaft (22) of an electromotive drive (10), wherein a curved, rounded stopping tip (40) is formed on at least one fore part (28, 30) of the shaft (22) by means of material deformation, which rounded stopping tip can support itself on an axial stopping face (32, 34), wherein the material deformation to form the stopping tip (40) is executed by means of a deformation roller (56), while the armature shaft (22) is held by means of a gripper.

2. Method according to claim 1, characterized in that the material deformation to form the rounded stopping tip (40) is executed by means of a deformation roller (56).

3. Method according to claim 2, characterized in that one working surface (66) of the deformation roller (56) and the fore part (28, 30) of the shaft (22) rotate relative to one another, the fore part (28, 30) and the working surface (66) are adjusted axially relative to one another and the fore part (28, 30) and the working surface (66) are tilted relative to one another.

4. Method according to claim 3, characterized in that the material of the shaft (22) is induced to flow axially and/or radially via a variable adjustment of the fore part (28, 30) with respect to the working surface (66), thereby generating a compressed, smooth surface of the rounded stopping tip (40).

5. Method according to claim 3, characterized in that a radius (76) is formed on the rounded stopping tip (40), which is determined by the distance of the working surface (66) to a tilting point (78) on an axis (64) of the shaft (22).

6. Method according to claim 1, characterized in that at least one phase (70) is manufactured on the shaft (22) before forming at least one rounded stopping tip (40).

7. Method according to claim 1, characterized in that to begin with at least one component (44, 18, 20, 21), in particular an armature (18) of an electromotive drive (10), is mounted on the shaft (22) and afterwards at least one rounded stopping tip (40) is formed.

8. Method according to claim 1, characterized in that the forming of at least one rounded stopping tip (40) takes place before the forming of a worm (26) on the shaft (22).

9. Method according to claim 4, characterized in that a radius (76) is formed on the rounded stopping tip (40), which is determined by the distance of the working surface (66) to a tilting point (78) on an axis (64) of the shaft (22).

10. Method according to claim 2, characterized in that at least one phase (70) is manufactured on the shaft (22) before forming at least one rounded stopping tip (40).

11. Method according to claim 3, characterized in that at least one phase (70) is manufactured on the shaft (22) before forming at least one rounded stopping tip (40).

12. Method according to claim 4, characterized in that at least one phase (70) is manufactured on the shaft (22) before forming at least one rounded stopping tip (40).

13. Method according to claim 5, characterized in that at least one phase (70) is manufactured on the shaft (22) before forming at least one rounded stopping tip (40).

14. Device to adjust moveable parts belonging to a motor vehicle, with a housing (16), an electric driving motor (12) featuring an armature shaft (22) and a worm gear (14), which gear is effectively connected with the driving motor (12) via the armature shaft (22), whereby the armature shaft (22) is manufactured by forming a curved, rounded stopping tip (40) on at least one fore part (28, 30) of the shaft (22) by means of material deformation, which rounded stopping tip can support itself on an axial stopping face (32, 34), wherein the material deformation to form the stopping tip (40) is executed by means of a deformation roller (56), while the armature shaft (22) is held by means of a gripper, characterized in that a rounded stopping tip (40) that supports itself with respect to the housing (16) via a stopping face (32, 34) is formed on at least one fore part (28, 30) of the armature shaft (22) by means of material displacement.

15. Device to manufacture an armature shaft (22) of an electromotive drive (10), the device comprising a gripper for holding the armature shaft (22), characterized in that the device (50) features a deformation head (54) rotating around a rotational axis (58) with a deformation roller (56) and at least one adjusting unit (60, 62) for axial and/or radial adjustment and tilting of the deformation roller (56) with respect to the rotational axis (58).

* * * * *